July 6, 1926.
R. M. G. PHILLIPS
1,591,141
COMBINED AUTOMOBILE SHIELD AND HEATER AND CONTROLLING SYSTEM FOR SAME
Filed March 23, 1925    2 Sheets-Sheet 1
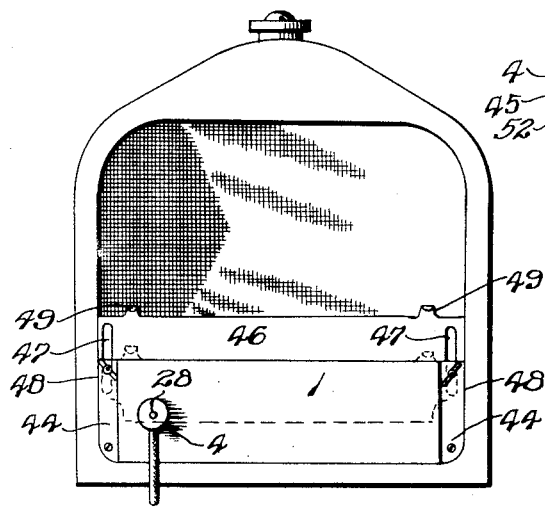
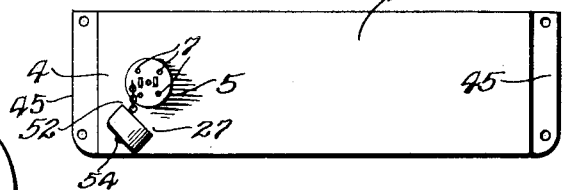
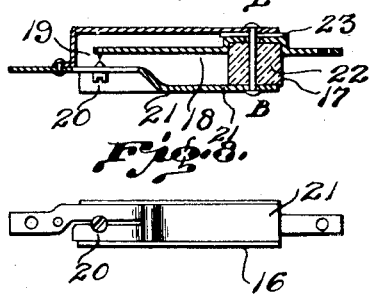
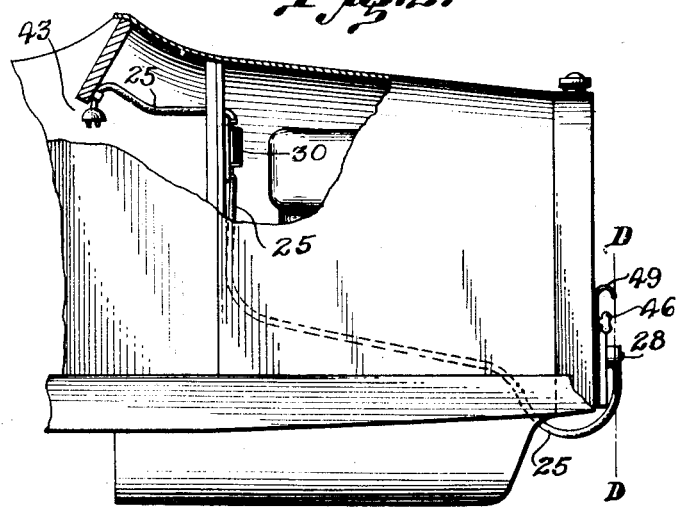
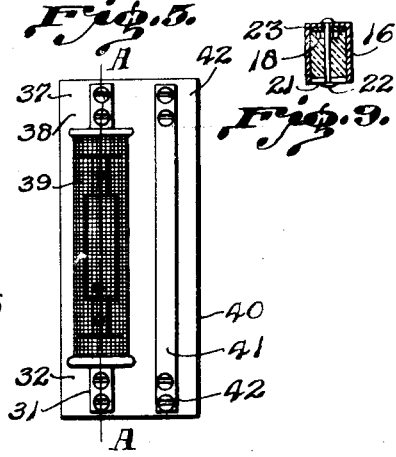
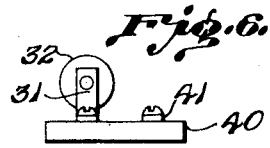
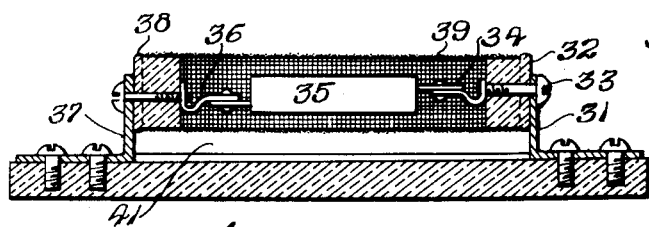
Inventor
Ross M. G. Phillips
By Leslie P. Fallon
Attorney

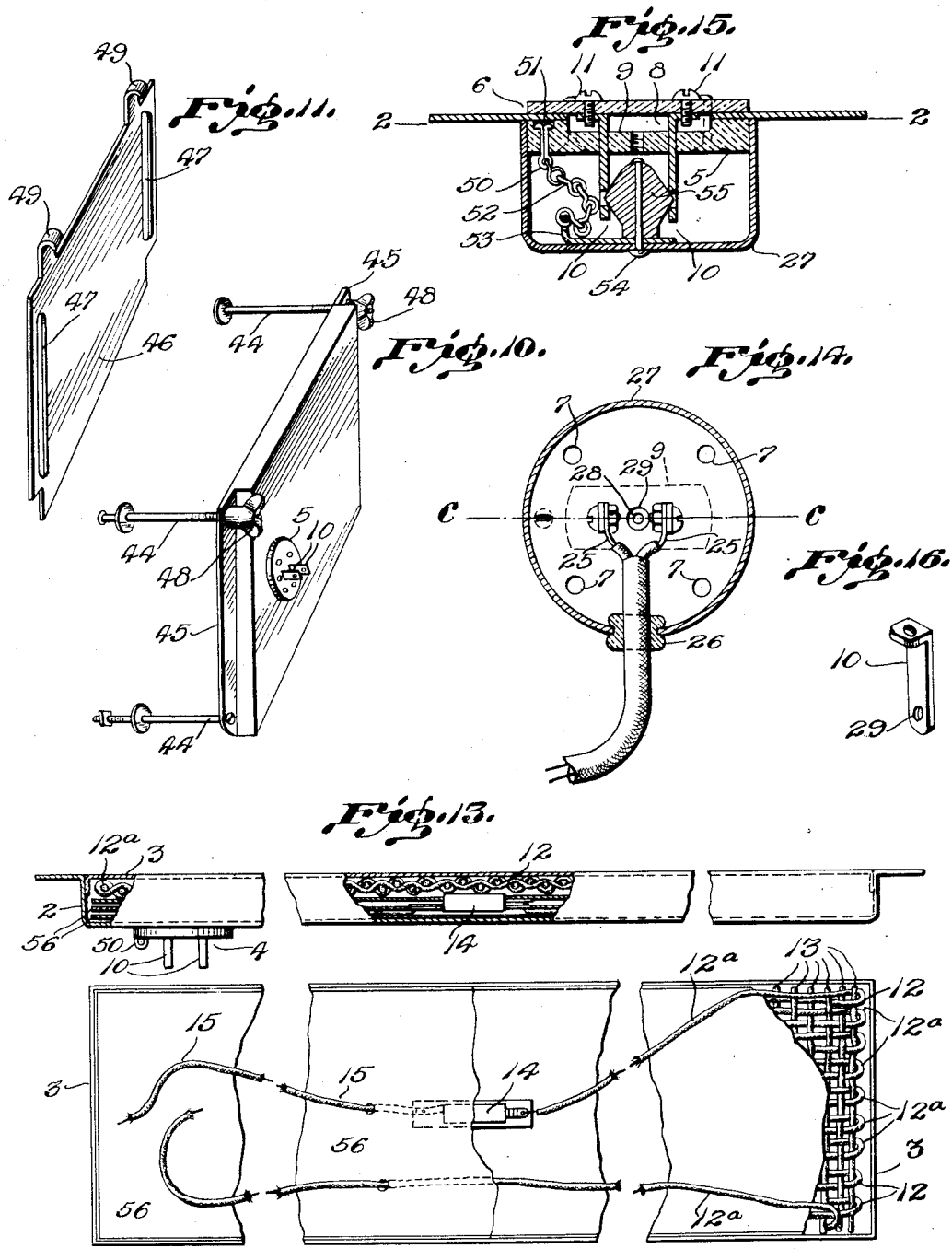

Patented July 6, 1926.

1,591,141

UNITED STATES PATENT OFFICE.

ROSS M. G. PHILLIPS, OF NEW HAVEN, CONNECTICUT, ASSIGNOR TO PERLIE D. FALLON, OF NEW YORK, N. Y.

COMBINED AUTOMOBILE SHIELD AND HEATER AND CONTROLLING SYSTEM FOR SAME.

Application filed March 23, 1925. Serial No. 17,674.

Figure 1 is a front view of an automobile radiator, showing the combined shield and heater attached to the lower part of the radiator and the air regulating means in partial raised position.

Figure 2 is a side view of an automobile radiator and hood, showing the combined shield and heater attached to the lower front of the radiator. A section of the hood and body is broken away, showing the safety thermostat control and the connection to the dash for attaching to an electric light circuit.

Figure 3 is a front view of the combined shield and heater, showing the plug connection cap removed and its attaching means to the shield. This shows the shield as it would be when not used with the safety thermostat control.

Fig. 4 is a side view in section, of the safety thermostatic control, on line A—A Fig. 5, showing the thermostat in its safety compartment.

Fig. 5 is a top view of the safety thermostatic control.

Fig. 6 is an end view of Fig. 5.

Fig. 7 is a sectional view of the thermostat used in both the shield and the hood control.

Fig. 8 is a bottom view of Fig. 7.

Fig. 9 is a sectional view on line B—B Fig. 7, showing the insulating means for holding the themostatic metal in place.

Fig. 10 is a perspective view of the combined shield and heater, showing the plug connection cap removed. The radiator bolts are shown with the thumb nuts for locking the air regulating means in place. Also showing the washers that go on back of the radiators.

Fig. 11 is a perspective view of the air regulating shield.

Fig. 12 is a view of the inner case of the shield, with the heating element and thermostat in same. The asbestos heat insulation being broken away to show the heating element.

Fig. 13 is a top view of Fig. 12, a section being broken away to show the heating element, thermostat and asbestos heat insulation.

Fig. 14 is a view of the plug connection, the cap being in section and showing the electric wire connections for attaching the feed wires from the safety thermostatic control in the hood compartment.

Fig. 15 is a sectional view of the plug connection, on line C—C Fig. 14, showing the plug, showing how the plug connection cap is held in place when the shield is used without safety thermostatic control.

Fig. 16 is a perspective view of the connector contact 10.

My invention relates to an improvement in a combined radiator shield and heater for automobiles, the object being to provide a water proof shield for attaching across the lower part of the front of any automobile radiator during cold winter weather, to protect the radiator from the cold air when it is driven, and to provide heating means in the shield, that, when the car is in the garage or not being driven, can be connected to any electric light circuit and electrically heated, thus keeping the water in the radiator and the engine compartment under the hood, thoroughly warm, so that the engine will at any time start with the same ease and quickness that it does during the warm summer weather.

Another object is to have an electric heated shield themostatically controlled, so that it will automatically keep the shield at a uniform temperature with a minimum current consumption, the current automatically cutting out when the shield reaches the right temperature.

Another object is to provide thermostatic controlling means under the hood, that, when the temperature in the hood compartment reaches a certain degree of warmth, say around 60 degrees, it will cut out the current to the shield. By this means, when the car has been driven and the engine, radiator and hood compartment are warm, the safety thermostatic control will not allow the current to be turned on to the shield until the temperature of the hood compartment has dropped down to a lower temperature than the thermostat is set off, which might be some length of time after the car is in the garage, thus greatly reducing the current consumption.

As all thermostats make a spark when the contact makes or breaks, it is an important object of this invention to provide a safety thermostat in the hood compartment that is absolutely fire and explosion proof, so that in case of any leakage of gasoline from the carburetor or gasoline pipe line, there can absolutely be no danger of fire or explosion from the working of the thermostat.

Another object is to provide a radiator heating device, that in itself is absolutely fire and explosion proof by the heating element and thermostat being hermetically sealed in a metal case.

Still another object is to provide an air regulating shield to work in conjunction with the heating shield, that in extreme cold weather when the heating shield is not sufficient protection to the radiator, the air regulating shield can be raised to any desired height, thereby giving a greater protected area to the radiator.

In carrying out my invention as herein shown, I employ a water and fireproof metal case or shield 1, comprising an outer and inner case 2 and 3 that are soldered together tightly, thereby hermetically sealing the elements within the case and making them fire and water proof. On the outer side of the case 2 is an electric plug connection 4, comprising an outer insulating plate 5, moulded out of any suitable insulating material or composition. An inner insulating plate 6 of similar insulating material is attached to the inner side of the case 2 by rivets or screws 7 extending through the plates 5 and 6 and the case 2 and drawing both plates tight to the case 2 making a water proof joint. (See Fig. 15.) An opening 8 is cut in the metal case 2 and the plate 5 has a recess 9 moulded in its inner side and corresponding to the opening 8 in the case 2. Connector contacts 10 are attached to the plate 6 by contact screws 11, that screw into a foot formed on the connector contact 10. (See Fig. 16.) The contacts 10 extend through recess 9 and the plate 5, on the outside of which they form contact terminals for attaching to any ordinary electric plug.

The case 1 is designed to receive a heating element 12, preferably comprising an asbestos covered resistance wire 12ª, that is woven through asbestos cords 13, forming a fire proof, woven heat element, that can lie tight against the bottom of the inner case 3. One end of the resistance wire 12ª is connected to one end of a small thermostat 14, the other end of the thermostat being connected to an insulated conductor 15, which connects to one of the contact terminals 10, by a terminal screw 11. The other terminal contact 10 being connected direct to the other end of the resistance wire 12ª of the heat unit 12.

Figs. 7, 8 and 9 show the construction of this particular thermostat, which comprises a metal case 16, one end of which has an insulating block 17, made of any suitable insulating material, preferably moulded. A narrow strip of thermostatic metal 21ª is formed over the insulating block 17 and extending beyond the thermostat case 16 forming a terminal for an electric connection. The other end of the thermostatic metal has a platinum point 19 fastened in same, which is in contact with the platinum pointed adjustment screw 20, that screws into the bottom piece 21 of the thermostat case 16 and is held rigid to same by a rivet or screw 22. A strip of sheet insulation 23, of mica or other insulating material, lies between the thermostatic metal strip and the case 16, so that when the bottom piece 21 and the case 16 are riveted together, the thermostatic strip is entirely insulated from both as the hole in the thermostatic strip through which the rivet 22 passes, is enough larger than the rivet that it cannot touch same. The bottom piece 21 is split beyond the adjustment screw and sprung slightly together so that it acts as a lock for the adjustment screw and holding it firmly wherever it is set. The bottom piece 21 is bent upward at the adjustment end to allow the side walls of the case 16 to act as a protection to the adjustment screw 20, and extends beyond the case 16, forming a terminal to which is fastened the end of the case 16 by a rivet 24. (See Fig. 7.)

Connected to the connector contacts 10 are feed wires 25 that extend through a rubber bushing 26 in a cap 27 that fits snugly over the outer insulating plate 5 and held firmly in place by a retaining screw 28 which extends through an insulating bushing 29 and screws into the insulating plate 5. This makes a water proof case that keeps the terminal contacts dry under all conditions, whether the car is being driven in a driving rain or it is being washed with water from a hose. The contact terminals 10 have holes 29 near their outer ends to receive screws for fastening the feed wires 25 to and for another purpose to be hereinafter described.

The feed wires 25 extend under or around the radiator, into the hood compartment where they are attached to a safety thermostat control 30, that is attached to any convenient place under the hood. One of the feed wires is fastened to a terminal screw on an L shaped terminal plate 31, the upper end of which is fastened to an insulating head 32, made of any suitable insulating material, by a screw 33 which extends through the head 32 and fastening into a holding plate 34, to which is fastened one of the end terminals of a thermostat 35, as shown in Figs. 7 and 8. The other terminal of the thermostat being fastened to a similar holding plate 36, which is fastened to another L shaped terminal 37, thru an insulating head 38. Fitting tightly over the insulating heads is a case of fine gauze wire 39, similar to that used on miners' safety lamps. By this construction the thermostat 35 is hung inside the gauze and between the insulating heads 32 and 38, making a fire proof or safety thermostat that makes it impossible in case of any leakage of gasoline from the carburetor or gasoline pipe line, for a fire or explosion to be caused from any spark made from the making or breaking of the thermostat at the platinum points 19 and 20.

The terminal plates 31 and 37 are attached to an insulated base, 40, made of any suitable insulating material. Fastened to the base and running parallel with the thermostat case 39, is a terminal bar 41, which has terminal screws 42, to one of which is fastened the other feed wire 25. To the other terminal screw 42 and the terminal plate 37 is fastened a continuation of the feed wires 25 which are attached to any convenient place on the dash board or other part of the car and terminate in a connecting plug 43 of any standard construction that will connect to any ordinary lamp socket plug in the electric light circuit.

The metal case or shield is fastened to the automobile radiator by radiator bolts 44, that extend through openings for same in a fastening flange 45 formed on each end of the shield or case 1. Attached under the shield or case 1 is an air regulating shield 46, on each end of which are slots 47, through which pass the upper radiator bolts 44, the outer end of these bolts having thumb nuts 48. The air regulating shield 46 has finger lifts 49 on its upper edge which allows the shield to be raised or lowered to any desired position by loosening the thumb nuts 48 and held in position by tightening same. By this means, when there is extreme cold weather, the air regulating shield can be raised and locked in position to cut down the amount of cold air going through the radiator, or when the weather is mild to increase the amount of air through the radiator.

If it is not desired to use the thermostat safety control in the hood compartment, then the feed wires 25 are omitted and a safety cap 54 is attached to the insulating plate 5, as shown in Figs. 3 and 15. A cotter pin or other fastening means 50, extends through the outer edge of the outer insulating plate 5, the underside of which has a recess 51 for bending over and fastening the ends of the cotter pin 50. Fastened to the cotter pin head is a chain 52 the other end of which is attached to an anchoring piece 53 that is fastened to the cap 27, by a rivet or screw 54, that extends through a latching head 55 that snaps in the holes 29 of the contact terminals 10. This holds the cap firmly over the insulating plate 5, making it thoroughly water proof and does not allow the cap to be lost when the cap 27 is removed to connect the shield to the electric light circuit, as it is held to the insulating plate 5 by the chain 52.

Preferably the heating element 12 should have a few sheets of thin asbestos 56, on the outer side of the element, to throw the heat inward against the radiator and to keep the outside of the radiator cool.

In operation, the shield is attached to the lower front of the automobile radiator, the feed wire running from the terminal contacts on the shield to the safety thermostat in the hood compartment and on to the connecting plug on the dash or other part of the car. When driving, the shield protects the lower part of the radiator from the cold, the amount of protecting varying according to the position of the air regulating shield 46.

When the car is driven in the garage, the connecting plug is attached to the electric light circuit and when the temperature in the hood compartment drops down to whatever the safety thermostat is set for, which should be around 60 degrees, the thermostat makes contact and the current is turned into the heating element in the shield 1. The thermostat in the shield is set for around 300 degrees and when the temperature in the shield reaches this degree of heat, the thermostat cuts off the current and keeps it at this temperature until the temperature in the hood compartment reaches the degrees set for by the safety thermostat when the current is entirely cut out until again turned on by the safety thermostat. As the shield is against the lower part of the radiator it warms the water in the same, which has the same effect in the hood compartment as a hot water radiator in a small room, when the temperature in the compartment reaches the degree of heat that the safety thermostat is set to operate at, the same cuts out the current to the shield until the temperature drops down low enough to have the thermostat again turn on the current.

It can be seen from this, that when the car is driven into the garage and the radiator, engine and hood compartment are warm that it may be some length of time before the safety thermostat will turn on the current, this is especially true if a robe or other means is thrown over the hood and radiator to conserve the heat in the radiator and hood compartment. This makes an efficient and very economical system for the car.

As the water in the engine jacket and radiator and the temperature in the hood compartment is kept at around summer heat, the engine will start with all the ease and quickness of summer weather, thus greatly adding to the life of the engine and battery as well as to the convenience of the car owner.

I claim:

1. A combined driving shield and radiator heater comprising a casing, a heating element therein, means to attach said heating element to a source of electrical supply, and means to attach said casing to a radiator, the casing being adapted to keep cold air from the radiator while driving and the heating element adapted to warm said radiator when not in use.

2. A combined driving shield and radiator heater comprising a casing, a heating element therein, means to attach said heating element to a source of electrical supply, means to attach said casing to a radiator and a thermostat controlling said heating element responsive to the temperature of heating element and mounted in said heating element.

3. A combined driving shield and radiator heater comprising a casing, a heating element therein, means to attach said heating element to a source of electrical supply, means to attach said casing to a radiator and a thermostat controlling said heating element and responsive to the temperature of the engine compartment.

4. A combined driving shield and radiator heater comprising a casing, a heating element therein, means to attach said heating element to a source of electrical supply, means to attach said casing to a radiator and a thermostat controlling said heating element responsive to the temperature of the casing, and a second thermostat controlling said heating element responsive to the temperature of the engine compartment.

5. A combined driving shield and radiator heater comprising a casing, a heating element therein comprising resistance wires, means to attach said heating element to a source of electrical supply, means to attach said driving shield to a radiator, thermostat means to turn the electrical supply on and off at predetermined temperatures in the engine compartment, and thermostatic means to turn the electrical supply on and off at predetermined temperatures in said casing.

6. A combined automobile radiator shield and radiator heater, a casing, a heating element mounted therein comprising resistance wire, means to connect said heating element to a source of electrical supply comprising a plug connection extending through the casing and means to cover said plug connection.

7. In an apparatus for heating automobile radiators and engines, a heating element, a thermostat controlling said heating element, mounted adjacent to radiator and a thermostat controlling said heating element, mounted adjacent to engine, the said thermostats being responsive to the temperature adjacent to engine and radiator respectively.

8. In an apparatus for maintaining a warm temperature in automobile engine and radiator, a source of electric supply, a heating element, thermostatic means to control the flow of current to the heating element dependent upon the temperature of the engine and thermostatic means to limit the said flow dependent upon the temperature of the radiator.

9. In an apparatus for maintaining a warm temperature in automobile engine and radiator, a source of electric supply, a heating element, means to control the flow of current dependent upon the temperature of the engine, said means to limit the temperature of the said heating element and to maintain said temperature at substantially the same heat.

10. In an apparatus for maintaining a warm temperature in automobile radiators and engines, means of electric connection, a heating element, thermostatic means to open the flow of current to the heater at a predetermined temperature, a second thermostatic means to close the flow of current to the heater at a predetermined temperature and electric connecting means.

11. In an apparatus for maintaining a warm temperature in automobile radiators and engines, a means of electric connection, a heating element, a thermostat to open the flow of current to the heater at a predetermined temperature in the space adjacent engine, further thermostatic means to close the flow of current at a predetermined temperature in a space adjacent radiator and the first named thermostatic means adapted to close the flow of current at a predetermined temperature adjacent engine.

Dated: February 24th, 1925.

ROSS M. G. PHILLIPS.